(12) United States Patent
Luo et al.

(10) Patent No.: US 8,050,672 B2
(45) Date of Patent: Nov. 1, 2011

(54) TELECOMMUNICATION SYSTEM, MOBILE PHONE AND CALLING METHOD

(75) Inventors: Bi-Qing Luo, Shenzhen (CN); Shih-Fang Wong, Taipei Hsien (TW); Xin Lu, Shenzhen (CN); Fang-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 584 days.

(21) Appl. No.: 12/264,918

(22) Filed: Nov. 5, 2008

(65) Prior Publication Data
US 2009/0170503 A1    Jul. 2, 2009

(30) Foreign Application Priority Data
Dec. 27, 2007    (CN) .......................... 2007 1 0203432

(51) Int. Cl.
*H04W 84/00*    (2009.01)
(52) U.S. Cl. .................. 455/426.1; 455/41.2; 455/41.3; 455/554.1; 455/554.2; 455/417

(58) Field of Classification Search ............... 455/426.1, 455/41.1, 41.2, 41.3, 417
See application file for complete search history.

(56) References Cited

U.S. PATENT DOCUMENTS

| | | | |
|---|---|---|---|
| 7,177,664 B2 * | 2/2007 | Weinzweig et al. | 455/554.1 |
| 2004/0266350 A1 * | 12/2004 | Kim | 455/41.2 |
| 2005/0197061 A1 * | 9/2005 | Hundal | 455/41.2 |
| 2008/0139121 A1 * | 6/2008 | Wang et al. | 455/41.3 |

* cited by examiner

*Primary Examiner* — Nick Corsaro
*Assistant Examiner* — Michael Vu
(74) *Attorney, Agent, or Firm* — Altis Law Group, Inc.

(57) ABSTRACT

The present invention provides a telecommunication system, a mobile phone and a calling method adapted for the telecommunication system. The telecommunication system includes a mobile phone connected to a wireless network and a wired phone connected to a wired network. The mobile phone and the wired phone communicate each other within a predetermined coverage area. When there is not a wired phone within the predetermined coverage area or there is a wired phone within the predetermined coverage area and the current state of the wired phone is busy, the mobile phone makes a call via the wireless network. If there is a wired phone within the predetermined coverage area and the current state of the wired phone is idle, the mobile phone sends a phone number to the wired phone, and the wired phone makes the call via the wired network.

10 Claims, 5 Drawing Sheets

US 8,050,672 B2

TELECOMMUNICATION SYSTEM, MOBILE PHONE AND CALLING METHOD

TECHNICAL FIELD

The present invention relates to a telecommunication system and, more particularly, to a telecommunication system and a calling method adapted for the telecommunication system. The telecommunication system includes a mobile phone and a wired phone.

GENERAL BACKGROUND

Wired phones have been installed in almost all houses, meanwhile mobile phones become more and more popular. However, a mobile phone normally has to be held near the ear and, consequently the head, to hear the conversation, thus putting the user's brain completely within the range of electromagnetic radiation of the mobile phone. In addition, the farther the distance between the mobile phone and a base station is or the more the number of users within a predetermined coverage area is, the weaker the mobile phone signal is.

A wired phone connects to a wired network by a wire, therefore, the wired phone has no radiation and signal problem. However, operations for the wired phone are complex. For example, in the case that the balance of the mobile phone account is not enough to complete a phone call and the user wants to call someone by the wired phone, the user must redial the phone number one by one accurately on the wired phone. Consequently, using only mobile phone or only wired phone may be inconvenient to a user in certain scenario.

Accordingly, what is needed in the art is a telecommunication system that overcomes the aforementioned deficiencies.

SUMMARY

A telecommunication system is provided. The telecommunication system includes a mobile phone connected to a wireless network and a wired phone connected to a wired network. The mobile phone includes a receiver, a first communicating unit, and a central processing unit (CPU). The receiver is configured for receiving voice signals of a called party, wherein the voice signals are from the wireless network or transmitted by the wired phone from the wired network. The first communicating unit is configured for communicating with the wired phone within a predetermined coverage area, receiving the voice signals from the called party of the wired network via the wired phone at real time, and sending voice signals from a user of the mobile phone to the called party of the wired network via the wired phone at real time.

The CPU is configured for controlling the first communicating unit to send a search signal in response to a phone number input operation, judging whether the first communicating unit receives a response signal from the wired phone within a predetermined time period, making a call via the wireless network if the first communicating unit doesn't receive the response signal or the first communicating unit receives the response signal and a value of the response signal is a first value, controlling the first communicating unit to send the phone number signal to the wired phone, if the first communicating unit receives the response signal and the value of the response signal is a second value, processing the voice signals from the called party of the wired network via the wired phone to the receiver, and processing the voice signals from the user to the called party of the wired network via the wired phone.

The wired phone includes a second communicating unit, and a processing unit. The second communicating unit is configured for communicating with the first communicating unit within the predetermined coverage area, sending the voice signals from the called party of the wired network to the first communicating unit at real time, and receiving the voice signals from the user of the mobile phone via the first communicating unit to the wired network at real time. The processing unit is configured for acquiring the current state of the wired phone and controlling the second communicating unit to send the response signal to the mobile phone in response to the search signal from the mobile phone, and making the call via the wired network if the current state of the wired phone is idle.

Other advantages and novel features will be drawn from the following detailed description with reference to the attached drawings.

BRIEF DESCRIPTION OF THE DRAWINGS

The components in the drawings are not necessarily drawn to scale, the emphasis instead being placed upon clearly illustrating the principles of the telecommunication system. Moreover, in the drawings, like reference numerals designate corresponding parts throughout the several views.

DETAILED DESCRIPTION OF THE EMBODIMENTS

Figure 1:
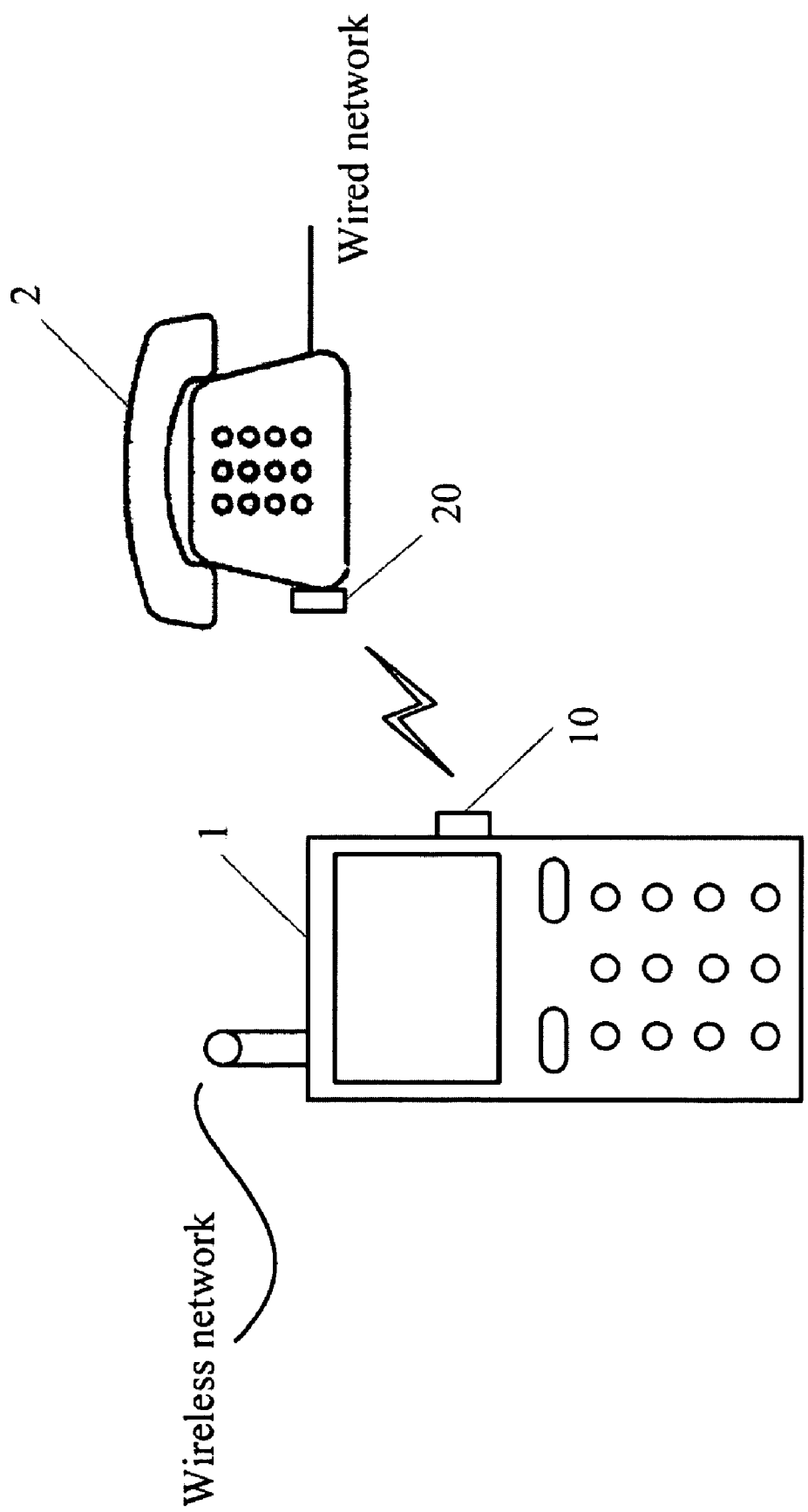
FIG. 1 is a schematic diagram of a telecommunication system in accordance with an exemplary embodiment.

FIG. 1 is a schematic diagram of a telecommunication system in accordance with an exemplary embodiment. The telecommunication system includes a mobile phone 1 and a wired phone 2. The mobile phone 1 works in a wireless network, such as the global system for mobile communication (GSM) network. The wired phone 2 connects to a wired network by wire, such as the public switched telephone network (PSTN). The mobile phone 1 includes a communicating unit 10. The wired phone 2 includes a communicating unit 20. The communicating unit 10 and the communicating unit 20 communicate each other within a predetermined coverage area. The predetermined coverage area may be a range, such as a five meter radius from the mobile phone 1 or the wired phone 2. The communicating unit 10 and the communicating unit 20 may be BLUETOOTH modules, or radio frequency identification (RFID) modules.

Figure 2:
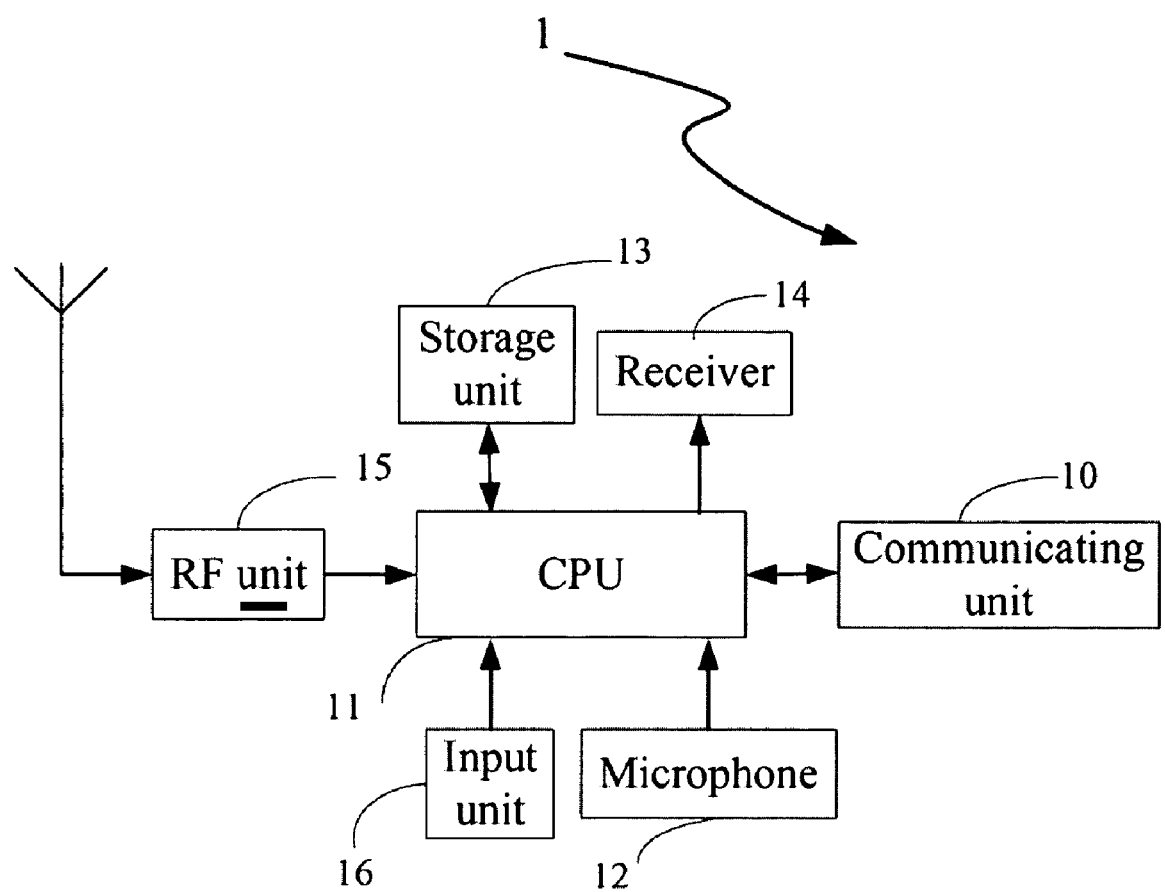
FIG. 2 is a block diagram of a hardware infrastructure of a mobile phone of FIG. 1 in accordance with an exemplary embodiment.

FIG. 2 is a block diagram of a hardware infrastructure of a mobile phone of FIG. 1 in accordance with an exemplary embodiment. The mobile phone 1 includes the communicating unit 10, a central processing unit (CPU) 11, a microphone 12, a storage unit 13, a receiver 14, a radio frequency (RF) unit 15, and an input unit 16. The RF unit 15 is configured for communicating with the wireless network, that is, the RF unit 15 is configured for receiving signals from the wireless network and transmitting signals from the CPU 11 to the wireless network. The storage unit 13 is configured for storing phone numbers.

The receiver 14 is configured for receiving voice signals from a called party through the wireless network or the wired network, that is, the receiver 14 is for receiving the voice signals from the RF unit 15 via the wireless network or from the communicating unit 10 via the wired network. The microphone 12 is configured for receiving voice signals from a user of the mobile phone 1. The input unit 16 is configured for generating input operations from the user of the mobile phone 1. The input unit 16 may be a keyboard, or a touch pad. The CPU 11 is configured for controlling the mobile phone 1 and processing the voice signals according to the input operations from the input unit 16. The communicating unit 10 is configured for communicating with the communicating unit 20 within the predetermined coverage area, receiving the voice signals which the wired phone 2 transmits from the wired network at real time, and sending the voice signals from the user to the wired network via the wired phone 2 at real time.

Figure 4:
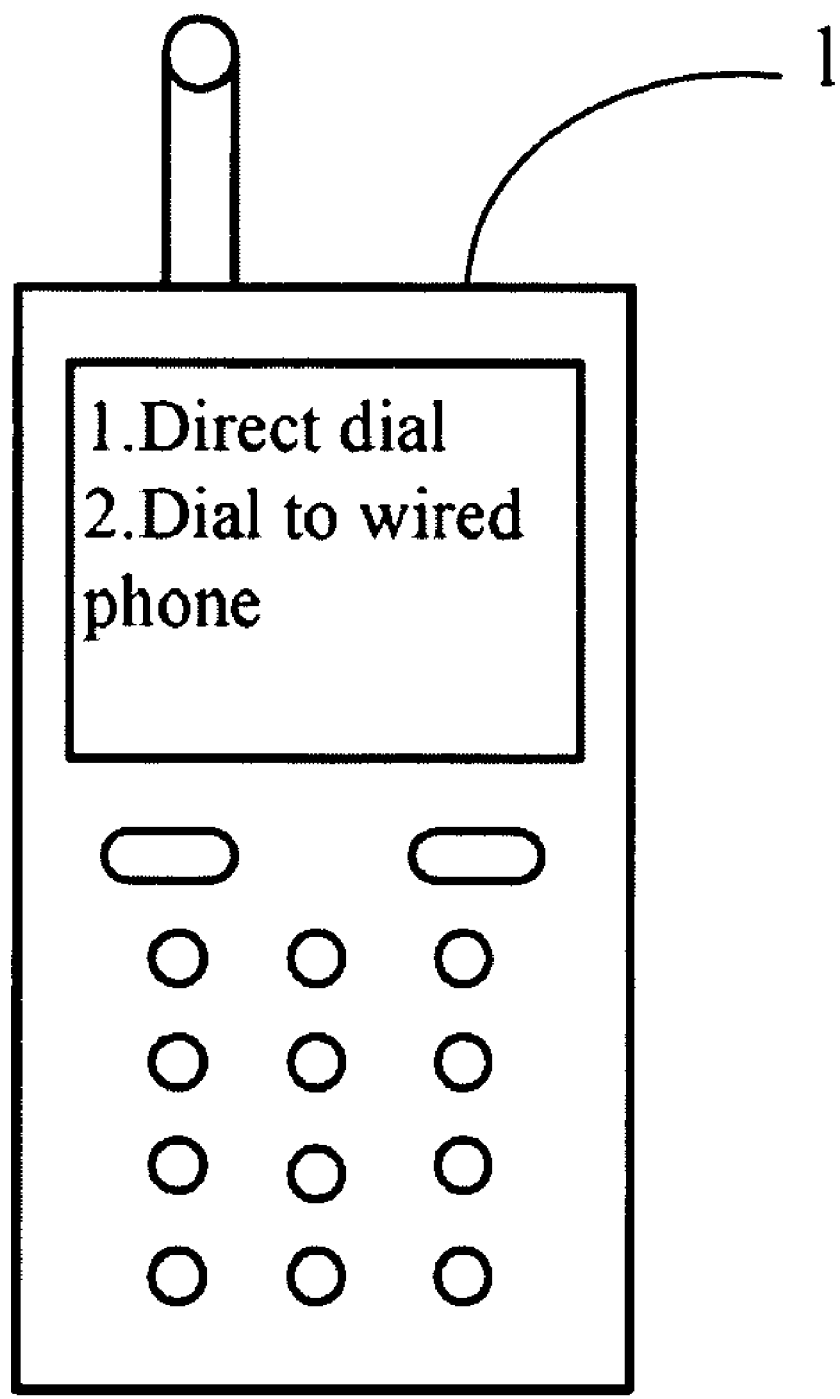
FIG. 4 is a user interface of the mobile phone of FIG. 2 in accordance with an exemplary embodiment.

The mobile phone 1 includes two dialing manners, such as that shown in a user interface of the mobile phone 1 of FIG. 4. As shown in FIG. 4, one of the dialing manners is "direct dial," and the other of the dialing manners is "dial to wired phone." The user may select one of the dialing manners by the input unit 16. In the "direct dial" manner, the mobile phone 1 makes a call via the RF unit 15 to the wireless network directly. In the "dial to wired phone" manner, the mobile phone 1 sends a phone number signal via the communicating unit 10 to the wired phone 2 and the wired phone 2 makes the call via the wired network if there is a wired phone 2 within the predetermined coverage area and a current state of the wired phone 2 is idle. If there is not a wired phone 2 within the predetermined coverage area or there is a wired phone 2 within the predetermined coverage area and the current state of the wired phone 2 is busy, the mobile phone 1 makes the call via the RF unit 15 to the wireless network.

In detail, if the mobile phone 1 is in the "dial to wired phone" manner, the CPU 11 receives the phone number signal generated from the input unit 16, controls the communicating unit 10 to send a search signal to search for a wired phone 2, and judges whether the communicating unit 10 receives a response signal from the wired phone 2 within a predetermined time period. If not receiving the response signal, that means, there is not a wired phone 2 within the predetermined coverage area, the mobile phone 1 makes the phone number call via the RF unit 15 to the wireless network. If receiving the response signal from the wired phone 2, that means, there is a wired phone 2 within the predetermined coverage area, the CPU 11 determines a value of the response signal and obtains the current state of the wired phone 2. For example, if the value of the response signal is a first value, that means, the current state of the wired phone 2 is busy, the CPU 11 makes the call via the RF unit 15 to the wireless network. If the value of the response signal is a second value, that means, the current state of the wired phone 2 is idle, the CPU 11 controls the communicating unit 10 to send the phone number signal to the wired phone 2, and the wired phone 2 makes the call via the wired network.

The wired phone 2 establishes a communication link with a called party via the wired network, and receives the voice signals from the called party. The communicating unit 20 sends the voice signals to the mobile phone 1 at real time. The CPU 11 processes the voice signals from the communicating unit 20 to the receiver 14. The user of the mobile phone 1 listens to the voice signals from the called party, and the microphone 12 collects the voice signals from the user to the CPU 11. The CPU 11 processes the voice signals of the microphone 12 from the user to the communicating unit 10. The communicating unit 10 transmits the voice signals of the microphone 12 from the user to the communicating unit 20. The wired phone 2 sends the voice signals from the user to the called party via the wired network.

Figure 3:
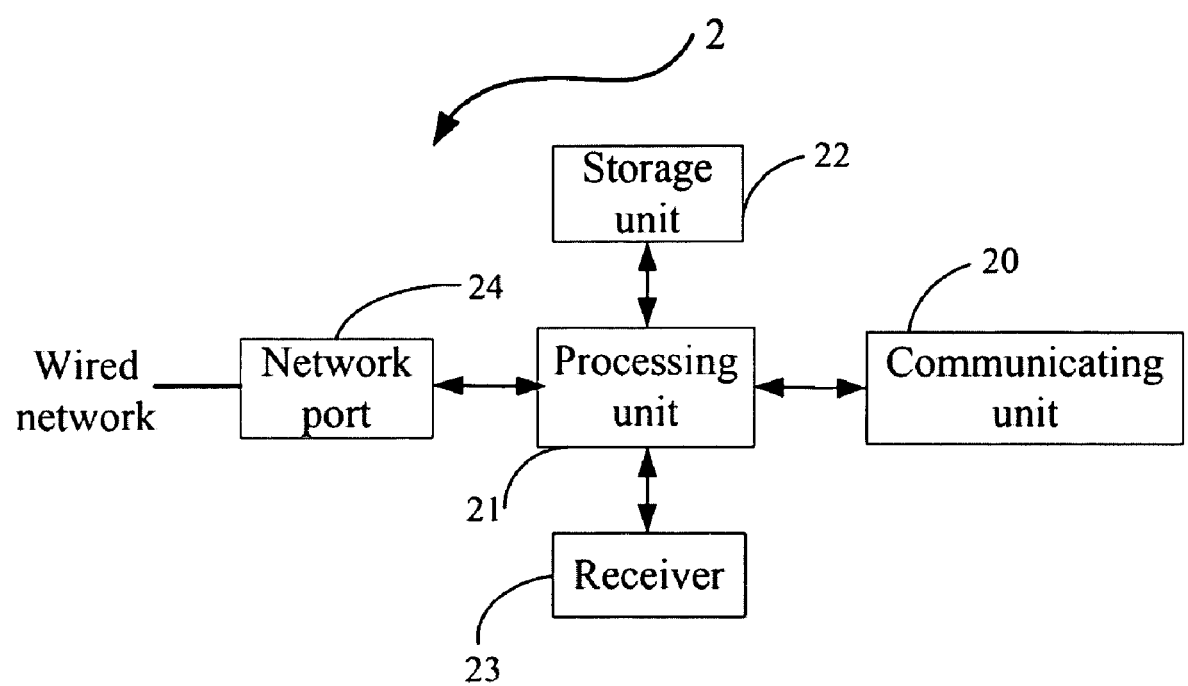
FIG. 3 is a block diagram of a hardware infrastructure of a wired phone of FIG. 1 in accordance with an exemplary embodiment.

FIG. 3 is a block diagram of a hardware infrastructure of a wired phone of FIG. 1 in accordance with an exemplary embodiment. The wired phone 2 includes the communicating unit 20, a processing unit 21, a storage unit 22, a receiver 23, and a network port 24. The network port 24 is configured for connecting the wired phone 2 to the wired network by wire, and sending voice signals from a user of the wired phone 2 to the wired network or the voice signals from the microphone 12 to the wired network via the communicating unit 10. The storage unit 22 is configured for storing phone numbers. The receiver 23 is configured for receiving the voice signals from the wired network, and collecting the voice signals from the user of the wired phone 2.

The communicating unit 20 is configured for communicating with the communicating unit 10, sending the voice signals from the called party via the wired network to the communicating unit 10, receiving the voice signals from the user of the mobile phone 1 and sending the voice signals to the wired network at real time. The processing unit 21 is configured for acquiring the current state of the wired phone 2 and controlling the communicating unit 20 to send the value of the response signal to the mobile phone 1, when the communicating unit 20 receives the search signal from the mobile phone 1. The processing unit 21 is further configured for making a call via the wired network, when the communicating unit 20 receives the phone number signal from the mobile phone 1 and the current state of the wired phone 2 is idle.

When the communicating unit 20 receives the search signal from the communicating unit 10, the processing unit 21 acquires the current state of the wired phone 2 and sends the value of the response signal to the communicating unit 10. If the current state of the wired phone 2 is busy, the processing unit 21 generates the response signal with the first value (hereinafter, "the first response signal") and controls the communicating unit 20 to send out the first response signal. If the current state of the wired phone 2 is idle, the processing unit 21 generates the response signal with the second value (hereinafter, "the second response signal") and controls the communicating unit 20 to send out the second response signal, the communicating unit 20 then receives the phone number signal from the communicating unit 10, and the processing unit 21 controls the network port 24 to make the call via the wired network. The processing unit 21 further stores the phone number in the storage unit 22, thereby the wired phone 2 can call the phone number directly without dialing each numeral of the phone number for a second time.

The wired phone 2 establishes a communication link with the called party. The communicating unit 20 sends voice signals of the called party to the communicating unit 10 and receives the voice signals of the microphone 12 from the user of the mobile phone 1 to the wired network at real time. Consequently, the mobile phone 1 and the wired phone 2 can both answer the call synchronously.

Figure 5:
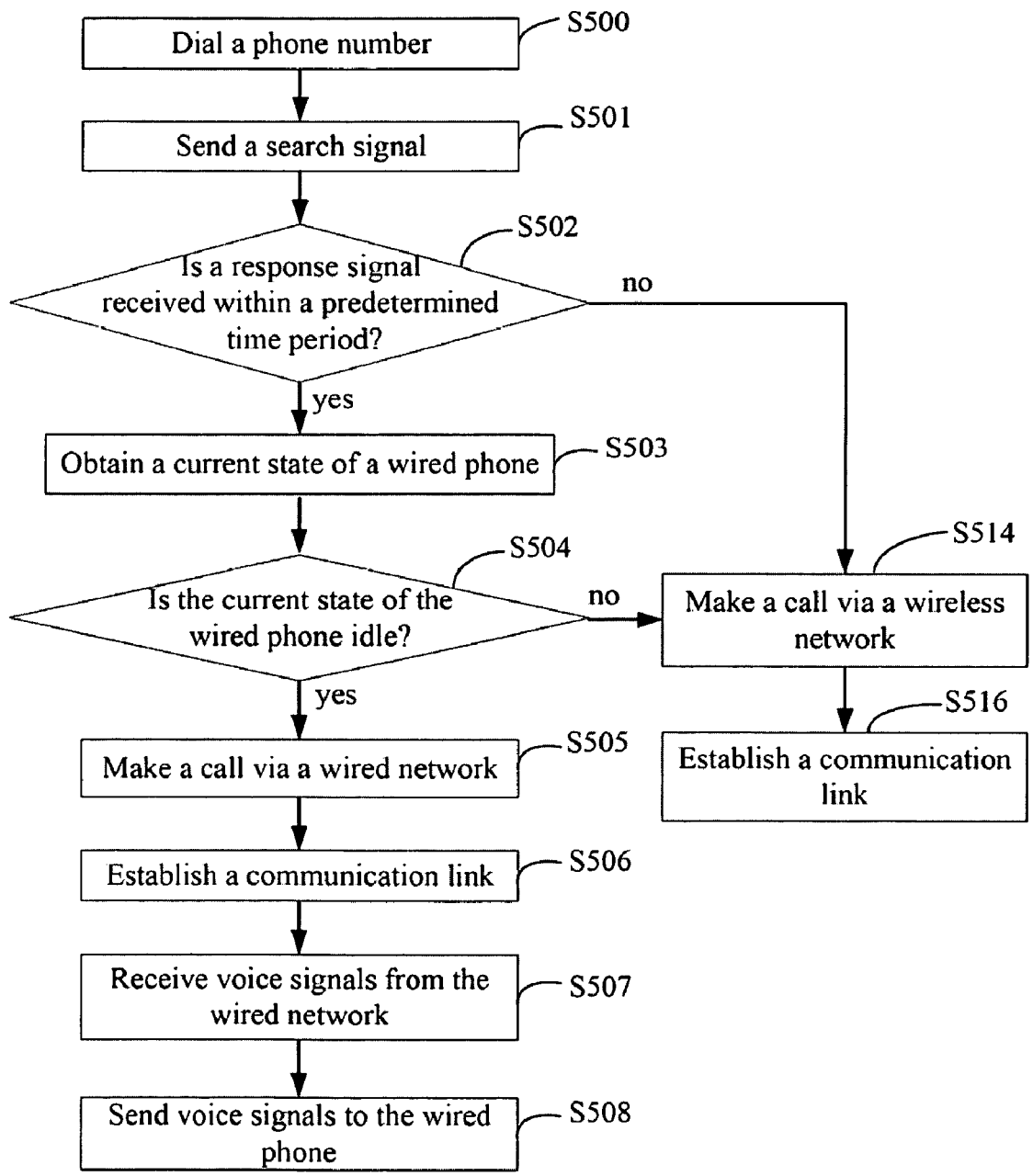
FIG. 5 is a flowchart illustrating a calling method implemented by the telecommunication system of FIG. 1, in accordance with an exemplary embodiment.

FIG. 5 is a flowchart illustrating a calling method implemented by the telecommunication system of FIG. 1, in accordance with an exemplary embodiment. When the mobile phone 1 is in the "dial to wired phone" manner, in step S500, the user of the mobile phone 1 dials the phone number by the input unit 16. In step S501, the CPU 11 controls the communicating unit 10 to send the search signal to search for a wired phone 2. In step S502, the CPU 11 judges whether the communicating unit 10 receives the response signal from the wired phone 2 within the predetermined time period. If the communicating unit 10 does not receive the response signal, that means, there is not the wired phone 2 within the predetermined coverage area, in step S514, the mobile phone 1 makes the call via the wireless network. In step S516, the mobile phone 1 establishes the communication link with the called party via the wireless network.

If the communicating unit 10 receives the response signal within the predetermined time period, that means, there is a wired phone 2 within the predetermined coverage area, in step S503, the CPU 11 determines the value of the response signal and obtains the current state of the wired phone 2. In step S504, the CPU 11 determines whether the current state of the wired phone 2 is idle. If the current state of the wired phone 2 is busy, the procedure returns to step S514, the mobile phone 1 makes the call via the wireless network.

If the current state of the wired phone 2 is idle, in step S505, the communicating unit 10 sends the phone number signal to the communicating unit 20, and the processing unit 21 makes the call via the network port 24 and stores the phone number in the storage unit 22. In step S506, the wired phone 2 establishes the communication link with the called party via the wired network. In step S507, the communicating unit 20 sends the voice signals of the called party to the communicating unit 10, and the user of the mobile phone 1 listens to the voice signals via the receiver 14 from the communicating unit 20. In addition, the receiver 23 may also receive the voice signals of the called party from the wired network, therefore, another person can listen to the voice signals via the receiver 23 synchronously. In step S508, the microphone 12 collects the voice signals from the user of the mobile phone 1, the CPU 11 controls the communicating unit 10 to send the voice signals from the user of the mobile phone 1 to the called party via the communicating unit 20. In addition, the processing unit 21 may also send the voice signals from the receiver 23 to the called party.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A telecommunication system comprising:
a mobile phone, connected to a wireless network; and
a wired phone, connected to a wired network;
wherein the mobile phone comprises:
   a receiver, for receiving voice signals of a called party, wherein the voice signals are from the wireless network or transmitted by the wired phone from the wired network;
   a first communicating unit configured for communicating with the wired phone within a predetermined coverage area, receiving the voice signals from the called party of the wired network via the wired phone at real time, and sending voice signals from a user of the mobile phone to the called party of the wired network via the wired phone at real time; and
   a central processing unit (CPU), for controlling the first communicating unit to send a search signal in response to a phone number input operation, judging whether the first communicating unit receives a response signal from the wired phone within a predetermined time period, making a call via the wireless network if the first communicating unit doesn't receive the response signal or the first communicating unit receives the response signal and a value of the response signal is a first value, controlling the first communicating unit to send the phone number signal to the wired phone, if the first communicating unit receives the response signal and the value of the response signal is a second value, processing the voice signals from the called party of the wired network via the wired phone to the receiver, and processing the voice signals from the user to the called party of the wired network via the wired phone; and
the wired phone comprises:
   a second communicating unit configured for communicating with the first communicating unit within the predetermined coverage area, sending the voice signals from the called party of the wired network to the first communicating unit at real time, and receiving the voice signals from the user of the mobile phone via the first communicating unit to the wired network at real time; and
   a processing unit, for acquiring the current state of the wired phone and controlling the second communicating unit to send the response signal to the mobile phone in response to the search signal from the mobile phone, and outgoing the call via the wired network if the current state of the wired phone is idle.

2. The telephone system as recited in claim 1, wherein the wired phone further comprises a storage unit for storing a phone number.

3. The telephone system as recited in claim 1, wherein if the current state of the wired phone is busy, the processing unit generates the response signal with the first value to the second communicating unit; if the current state of the wired phone is idle, the processing unit generates the response signal with the second value to the second communicating unit.

4. The telephone system as recited in claim 1, wherein the first communicating unit and the second communicating unit are BLUETOOTH modules.

5. The telephone system as recited in claim 1, wherein the first communicating unit and the second communicating unit are radio frequency identification (RFID) modules.

6. A mobile phone, connected to a wireless network, for communicating with a wired phone connected to a wired network within a predetermined coverage area, comprising:
   a receiver, for receiving voice signals of a called party, wherein the voice signals are from the wireless network or transmitted by the wired phone from the wired network;
   a communicating unit, for communicating with the wired phone within a predetermined coverage area, receiving the voice signals from the called party of the wired network via the wired phone at real time, and sending voice signals from a user of the mobile phone to the called party of the wired network via the wired phone at real time; and
   a central processing unit (CPU), for controlling the communicating unit to send a search signal in response to a phone number input operation, judging whether the communicating unit receives a response signal from the wired phone within a predetermined time period, outgoing a call via the wireless network if the communicating unit doesn't receive the response signal or the communicating unit receives the response signal and a value of the response signal is a first value, controlling the communicating unit to send the phone number signal to the wired phone, if the communicating unit receives the response signal and the value of the response signal is a second value, processing the voice signals from the called party of the wired network via the wired phone to the receiver, and processing the voice signals from the user to the called party of the wired network via the wired phone.

7. A calling method for a telecommunication system, wherein the telecommunication system comprises a mobile phone connected to a wireless network and a wired phone connected to a wired network, the mobile phone comprises a first communicating unit, the wired phone comprises a second communicating unit, and the first communicating unit and the second communicating unit communicate each other within a predetermined coverage area, the method comprising:
- generating a search signal in response to a phone number input operation on the mobile phone;
- searching for the wired phone;
- judging whether a response signal is received from the wired phone within a predetermined time period;
- making a call via the wireless network if the first communicating unit does not receive the response signal; and
- making a call via the wireless network if the first communicating unit receives the response signal and a value of the response signal is a first value; or
- making the call via the wired phone if the first communicating unit receives the response signal and the value of the response signal is a second value.

8. The calling method as recited in claim 7, further comprising:
- storing the phone number in the wired phone after making the call via the wired phone.

9. The calling method as recited in claim 7, wherein the first communicating unit and the second communicating unit are BLUETOOTH modules.

10. The calling method as recited in claim 7, wherein the first communicating unit and the second communicating unit are radio frequency identification (RFID) modules.

* * * * *